May 2, 1939.  R. H. CRAMER  2,156,562
CENTERLESS GRINDING MACHINE
Filed May 23, 1936   8 Sheets-Sheet 1

Fig. 1

INVENTOR
RAYMOND H. CRAMER
BY
Giles P. Moore
HIS ATTORNEY

Fig.2

May 2, 1939.   R. H. CRAMER   2,156,562
CENTERLESS GRINDING MACHINE
Filed May 23, 1936   8 Sheets-Sheet 3

INVENTOR.
RAYMOND H. CRAMER.
BY
Gales P. Moore
HIS ATTORNEY.

May 2, 1939.    R. H. CRAMER    2,156,562
CENTERLESS GRINDING MACHINE
Filed May 23, 1936    8 Sheets-Sheet 5

INVENTOR
RAYMOND H. CRAMER
BY
Gales P. Moore
HIS ATTORNEY

INVENTOR
RAYMOND H. CRAMER
BY Gales P. Moore
HIS ATTORNEY

May 2, 1939.  R. H. CRAMER  2,156,562
CENTERLESS GRINDING MACHINE
Filed May 23, 1936  8 Sheets-Sheet 8

INVENTOR.
RAYMOND H. CRAMER
BY Sales P. Moore
HIS ATTORNEY.

Patented May 2, 1939

2,156,562

UNITED STATES PATENT OFFICE 2,156,562

CENTERLESS GRINDING MACHINE

Raymond H. Cramer, Newark, N. J., assignor to General Motors Corporation, Detroit, Mich., a corporation of Delaware Application May 23, 1936, Serial No. 81,498

44 Claims. (Cl. 51—103)

This invention relates to centerless grinding machines and comprises all of the features of novelty herein disclosed. An object of the invention is to provide an oscillating centerless grinding machine which is practical and efficient in producing very accurate contours on bearing rollers and the like. Other objects are to provide improved mechanisms for feeding articles to the machine without jamming and removing them therefrom. Other objects are to provide improved mechanisms for dressing or shaping the operating wheels to produce very accurate contours upon them and consequently upon the work. Another object is to provide means for accurately locating the work with reference to the operating parts to further insure accuracy of product. Yet another object is to provide an improved drive mechanism for an oscillating unit in a centerless grinder.

To these ends and also to improve generally upon devices of this character, the invention consists in the various matters hereinafter described and claimed. In its broader aspects the invention is not necessarily limited to the specific construction selected for illustrative purposes in the accompanying drawings in which

First referring to the general features of the preferred machine, which is designed to grind barrel shaped rollers, although it is readily adapted to grind waisted rollers and rollers of other shapes, a barrel shaped roller rotates between a wide grinding wheel and a narrow regulating wheel while supported on a work blade, the regulating wheel and work blade oscillating as a unit about an axis so located as to swing the work in an arc having a radius corresponding to the radius of curvature of the barrel roller in an axial plane. The blade is contoured to fit the surface of the finished roller and both the wheels are dressed off to produce a contour corresponding to that desired for the roller. Each roller is fed onto the oscillating work blade when the latter is swung beyond one side of the grinding wheel and then the roller is pushed through the grinding throat and along the contoured surface of the wide grinding wheel by a roller stop or positioning member which engages one end of the roller and locates it exactly in the right position with respect to the work blade and tne regulating wheel. As the roller sweeps past the contoured grinding wheel and is ground thereby, it is ejected at the opposite side of the grinding wheel by a hooked ejecting finger.

Figure 1:
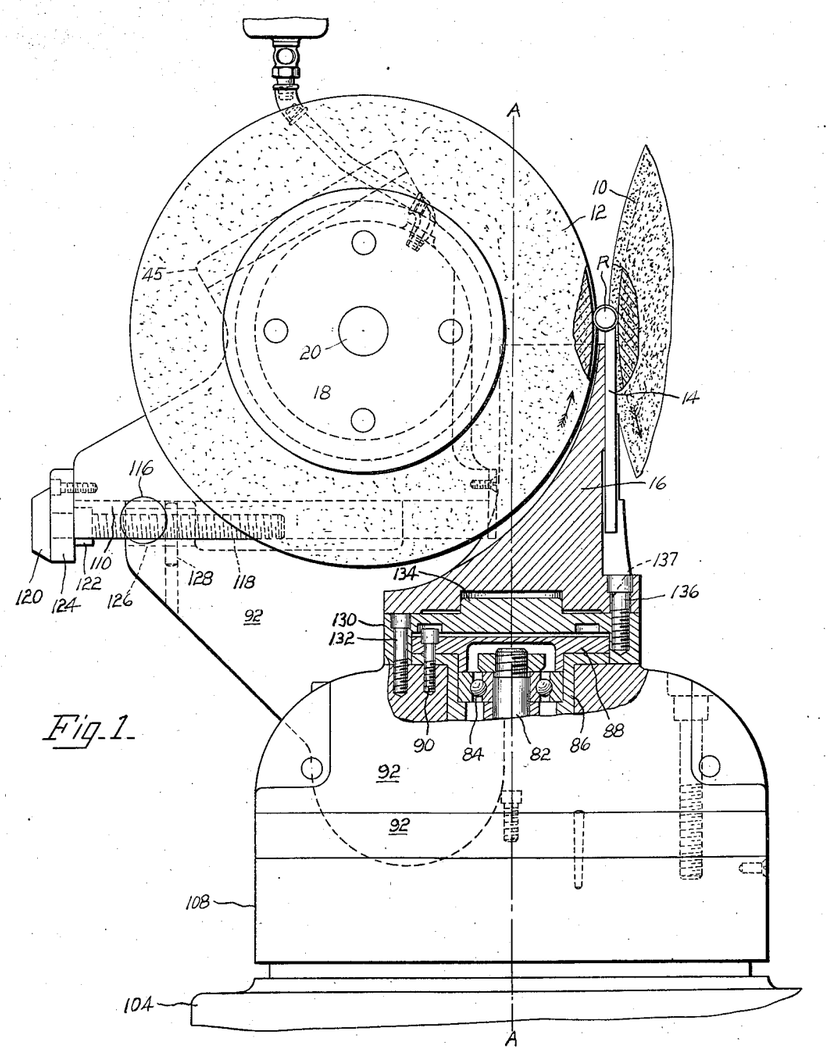
Fig. 1 is a side elevation of a portion of the machine, portions of the wheels and the work supporting means being broken away and sectioned.
Figure 2:
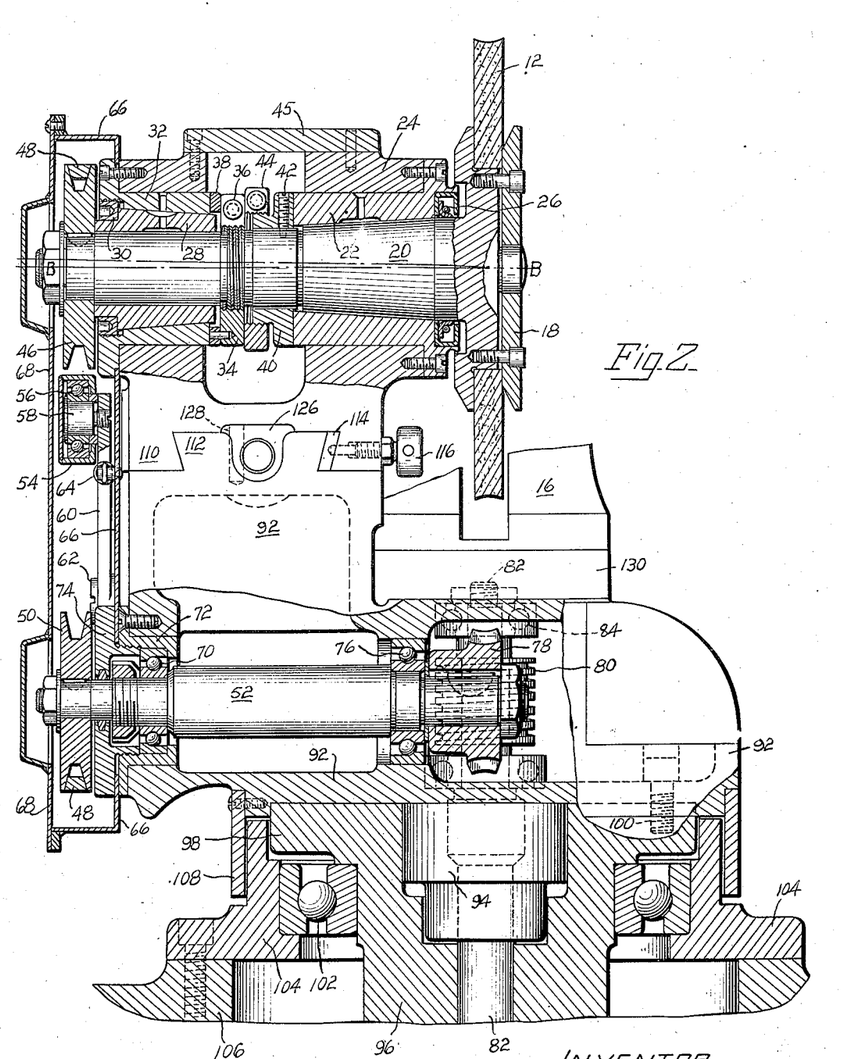
Fig. 2 is chiefly a cross section of the regulating wheel unit, some parts being shown in front elevation.

In Figures 1 and 2, the numeral 10 indicates a wide grinding wheel having its periphery transversely concave. Opposed to this wheel is an abrasive regulating wheel 12 which is comparatively narrow and has a transversely concave periphery. A barrel shaped roller R is supported on an angle-topped work blade 14 at a location preferably slightly above the level of the wheel centers, the blade being secured to an upright standard 16 which oscillates as a unit with the regulating wheel about an axis indicated by the line A—A. The distance of this axis from the grinding surface determines the transverse radius of curvature of the rollers. The axis of the regulating wheel is indicated by the line B—B in Fig. 2 and this line is preferably inclined to the horizontal at a slight angle in order that the work piece may be urged against a positioning member as will appear. Otherwise stated, this axis is slightly inclined to a common plane containing the axis of the grinding wheel and the axis of the work-piece.

The regulating wheel is secured by a clamping plate 18 to the enlarged end of a spindle 20 which is inclined to the horizontal as above mentioned. The spindle has a tapered portion journaled for rotation in an internally tapered flanged bushing 22 which is bolted to one end of a wheel head 24, a suitable seal 26 being interposed between the bushing 22 and the spindle to exclude grit. The spindle is also journalled in a second bearing bushing 28 which is externally tapered and provided with a shoulder engaged by a nut 30 by which the bushing is adjusted endwise in an internally tapered flanged sleeve 32 bolted to the opposite end of the work head. At an intermediate portion of the spindle, it is surrounded by a split lock nut 34 having a clamping screw 36 to provide a thrust collar engaging on one side against a thrust washer 38 which in turn bears against the end of the flanged sleeve 32. Adjacent to the lock nut, a flanged collar 40 is fastened to the spindle by a screw 42, one end of the collar bearing against the bushing 22 and another portion of the collar being externally threaded to receive the threads on a split lock nut 44 similar to the lock nut 34 and engaging the latter. The nuts hold the spindle endwise and provide for adjustment to take up wear in the bushing 22. Access to the lock nuts and their clamping screws is provided by an opening in the head closed by a cover plate 45.

The spindle has a pulley 46 keyed to it and driven by a belt 48 from a pulley 50 keyed on the end of a countershaft 52. To keep the belt tight in the different positions of the work head on a cross slide, an idler roll 54 is journalled on a ball bearing 56 carried by a stud 58 on the upper end of an arm 60 which is pivoted at 62 and is urged to swing in one direction by a coil spring 64 anchored to the arm and to the anchoring stud projecting from a pulley guard 66 having a cover 68. The countershaft 52 is journalled near one end in a ball bearing 70 whose inner race ring is clamped on the shaft by a nut and whose outer race ring is clamped in a flanged bearing housing 72 by a threaded cap 74, this cap being flanged and also holding the pulley guard 66 in position. The countershaft is also journalled on a ball bearing 76 whose outer race ring floats in a bearing seat, the inner race ring being secured against a shoulder on the shaft by a washer and a worm wheel 78 which is keyed on one end of the shaft.

The worm wheel 78 is driven by a worm 80 keyed to a vertical shaft 82 whose upper end is journalled in a ball bearing 84 supported by a flanged bearing housing 86, the outer race ring of the bearing being clamped by a cap 88 which is secured by screws 90 to an oscillating support 92, this oscillating support carrying the entire work head unit and oscillating about the above mentioned axis A—A. The support 92 has a depending pilot stud 94 entering a recess at the upper end of a hollow oscillating column 96 having a flange 98 to which the support 92 is secured by screw bolts 100. The flange 98 rests on the inner race ring of a ball bearing 102 the outer race ring of which is in turn supported by an annular flange on a ring 104 which is secured by screws to a base 106. In this base, there is any suitable mechanism for rotatably driving the shaft 82 and for causing the column 96 to oscillate about the vertical axis A—A.

The wheel head 24 is adjustable crosswise with respect to the axis of oscillation A—A to take up wear in the regulating wheel and is provided with dovetailed ways 110 to slide on a dove tailed tongue 112, a suitable gib 114 and lock screw 116 being provided. A feed screw 118 is journalled for rotation without endwise movement on the head by collars 120 and 122 embracing a plate 124 fastened to the work head. The screw is threaded in a nut 126 fastened by a pin 128 to the oscillating support 92. The adjustment of the wheel head on the slide provides compensation for the wear of the regulating wheel in operation and preserves the accurate location of the work with respect to the work support and the grinding wheel.

Figure 3:
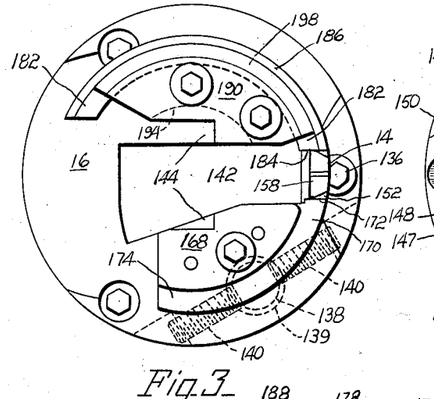
Fig. 3 is a plan view of the standard with the work supporting blade and associated parts of Figs. 7 to 11 assembled thereon.

An adapter ring 130 is fastened by screws 132 to the oscillating support 92 and is provided with an upwardly extending pilot 134 entering a recess in the bottom of the standard 16. Differently designed and dimensioned standards and co-operating members are provided for the different work pieces, the radius of oscillation at the geometric center of the roller R being determined by the distance from the axis of oscillation A—A to the nearer edge of the work blade 14 which serves as a plane of reference through the axis of the roller. The standard 16 is fastened by screws 136 to the adapter, the holes 137 in the standard for these screws being slightly oversize so that the standard can be angularly adjusted. To accomplish this very fine angular adjustment which will put the center of the work blade in the vertical plane including the centers of the grinding and the regulating wheels, a stud 138 (Fig. 3) projects upwardly from the adapter into an oversize hole 139 in the bottom of the standard and is engaged on each side by tangent screws 140 which are threaded in holes 141 of the standard, the screws 136 of course being loosened when angular adjustment is made. This adjustment will also compensate for wear in the blade pocket, which wears faster at one end in front of a locating stop or pusher which forces the rollers through the machine as will appear.

Figures 4, 5, 7, 8, 9, 10, 11:
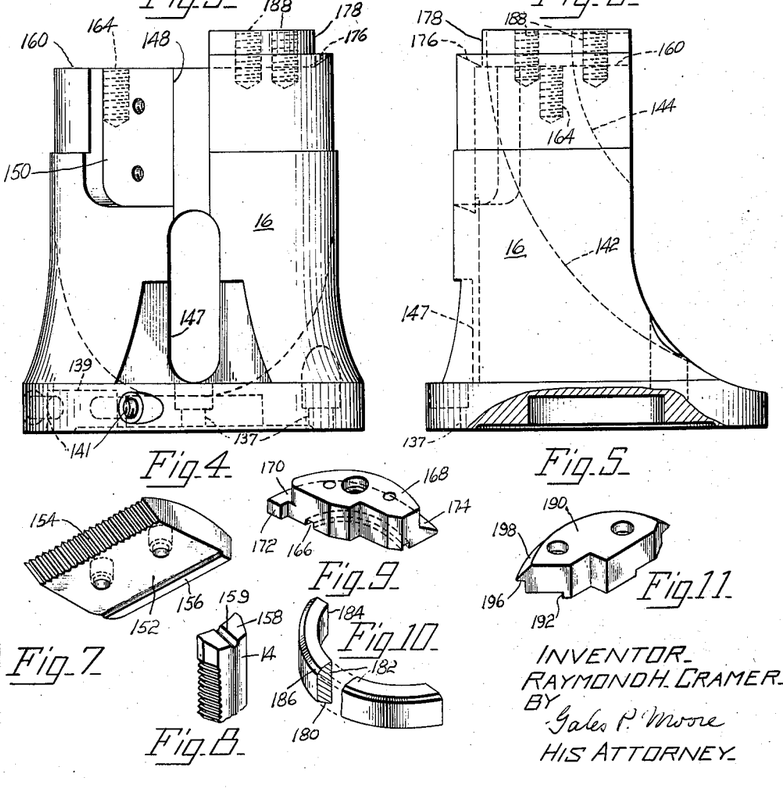
Fig. 4 is a rear view of the standard.
Fig. 5 is a side view of the standard of Fig. 4, a portion being in section.
Fig. 7 is a perspective view of a blade clamp.
Fig. 8 is a perspective view of the upper portion of the blade or work support.
Fig. 9 is a perspective view of a cam plate which operates with roller ejecting mechanism.
Fig. 10 is a perspective view of a roller locating plate.
Fig. 11 is a perspective view of a clamp for the locating plate of Fig. 10, this clamp also having an operating surface for co-operation with roller feed mechanism.
Figure 6:
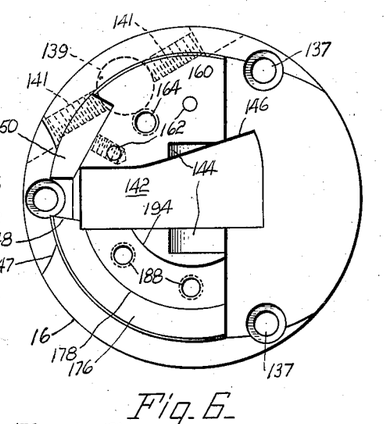
Fig. 6 is a top plan view of the standard of Fig. 5, the standard being turned 180° from its Fig. 3 position.
Figures 11A, 12:
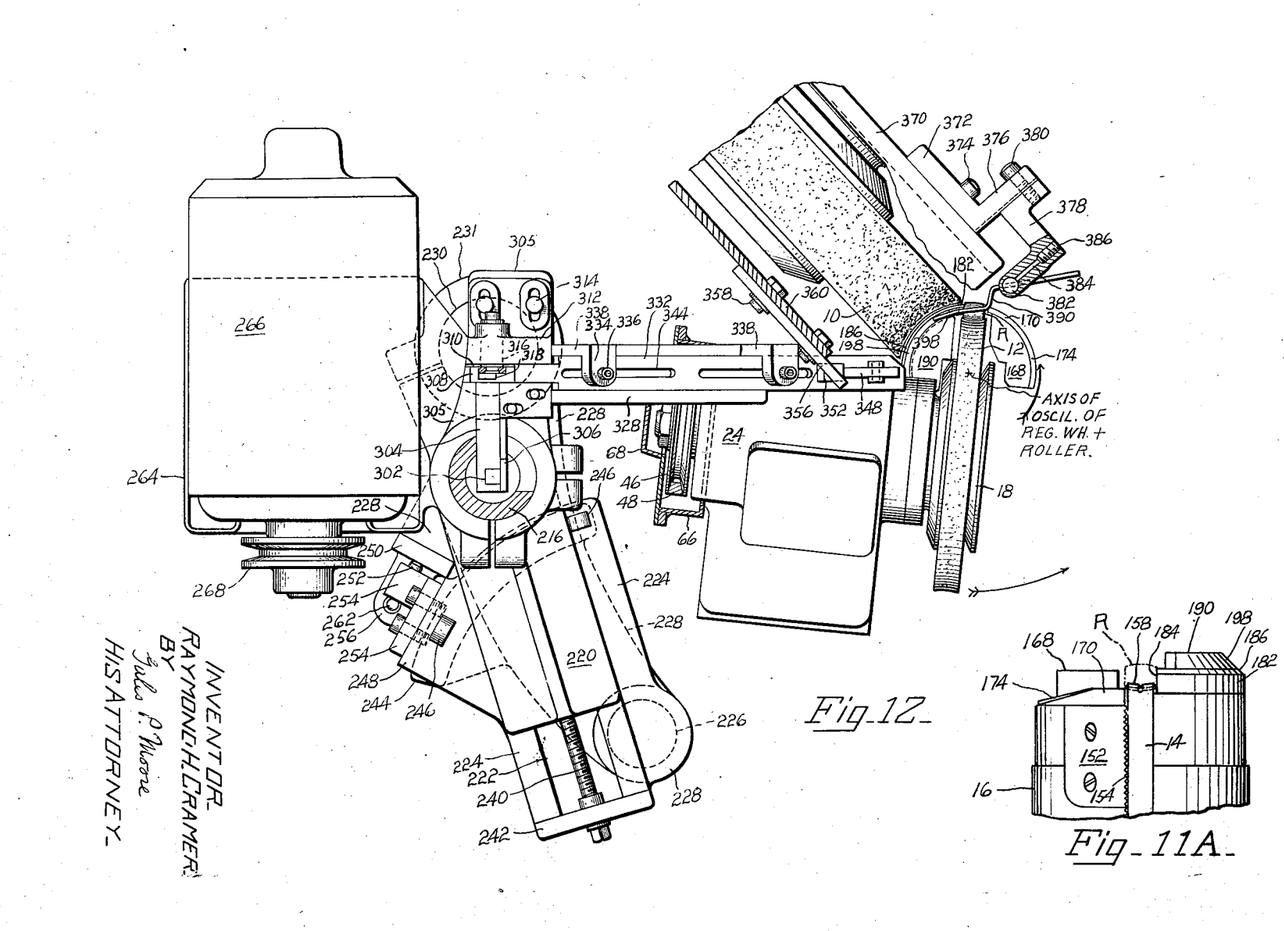
Fig. 11A is a rear view of the upper portion of the standard with the work supporting blade and associated parts assembled thereon as in Fig. 3.
Fig. 12 is a plan view of a portion of the machine with some parts in section and with the regulating wheel swung to work removing position.

Referring to Figures 4, 5 and 6, the standard 16 is provided with a deep central recess 142 to accommodate the regulating wheel, there being shallower recesses 144 to accommodate the flanges which clamp the regulating wheel. The standard 16 is cut away on an incline as indicated at 146 to facilitate the removal of a regulating wheel from its spindle, and the standard is further provided with a cut-away portion 147 to provide for access to the adjacent screw bolt 136. The standard is also provided wtih a vertical undercut shoulder 148 to engage the blade 14 which is dovetailed and, at one side of this notch, the standard has a recess 150 for a blade clamp 152 shown in detail in Figure 7. The clamp has an angled edge 154 provided with serrations and the opposite edge is provided with a little projection 156 to bear against the standard 16 and allow some compensatory tilting movement of the clamp when it is secured against the blade. As indicated in Figures 8 and 11A, one of the vertical edges of the blade is provided with serrations interfitting with those of the blade clamp and the top surface 158 of the blade is contoured or pocketed to fit a roller, such surface also being inclined downwardly towards the regulating wheel and having a central drain recess 159 for grit. This recess also clears the flash or fin which may be left at the center of the roller due to cold heading besides giving two separated areas of contact which prevent rocking of the roller.

The standrard 16 is lower on one side as indicated at 160 in Figs. 4, 5, 6 and 11A and the top of it is here provided with a pair of spaced dowel holes 162 and wtih a screw hole 164. An arcuate groove 166 (Fig. 9) at the bottom of a cam plate 168 is adapted to fit over the dowels which are pressed in the holes 162. The cam plate 168 has a thick portion and a thinner arcuate portion 170 which projects as indicated at 172 close up to the top of the blade 14. The arcuate portion also has a cam surface 174 which comes into action when the rollers are ejected from the machine. When a product roller has been carried through the grinding throat, it is arrested by an ejector as will appear and, when the cam plate is carried back again, the cam surface 174 causes the arrested roller to roll off laterally into an exit chute at one side of the grinding wheel.

The higher side of the standard 16 is provided at the top with an arcute recess formed by a side wall 176 which is inclined at about 30° to the horizontal and by a vertical side wall 178. Fitting in this recess is the bevelled bottom edge 180 of a roller locating plate 182, Figs. 3, 10 and 11A, which terminates in an edge or locating face 184 adapted to engage the end of a product roller and position it on the blade. The upper surface of the arcuate plate has its outer edge 186 bevelled off at an angle of 45° for a purpose which will appear. The top of the standard is provided with tapped openings 188 for screws which secure a clamp 190, Figs. 11 and 11A, for holding the arcuate plate 182 in adjusted position. The clamp 190 is provided at the bottom with a locating projection 192 which is arcuate on one side to fit an arcuate wall 194 at the interior of the standard 16. The clamp 190 has an arcuate overhang 196 which engages the top of the arcuate plate 182 and holds the latter in adjusted position with its roller locating face 184 at the distance of one half the roller length from the middle of the contoured blade surface 158 and square across the axis of the roller. This overhang 196 has its top surface 198 bevelled off at 45° to merge with the bevel surface 186, the arcuate bevel thus produced cooperating with a roller feed mechanism, as will appear, to retain the rollers therein while the oscillating unit is carrying a roller across the grinding wheel and coming back to secure an unground roller from such feed mechanism.

For different sizes of rollers, the entire standard 16, blade 14, blade clamp 152, cam plate 168, arcuate plate 182 and clamp 190 are removed from the machine and replaced by others which are accurately formed to properly locate and carry such rollers through the machine. It is important to have the rollers accurately sized as to length with their end faces exactly parallel. The accurate location and control of the motion of the rollers is very important in meeting the extreme accuracy of size and contour which are required on rollers for roller bearings for instance. The above described roller locating mechanism is adapted not only for full length barrel rollers but for rollers of less than full length since the locating face 184 will locate any such roller with its maximum diameter at the center of the blade pocket. While the grinding machine has been described by special reference to the grinding of convex or barrel rollers, it is evident that centrally waisted rollers or similar concave rollers of les than full length can be located and ground according to similar principles, the chief requirements being that the wheels and blade pocket have convex contours to correspond to the work curvature and that the face 184 be correctly located.

The mechanism for feeding and ejecting the rollers from the machine is indicated in Figures 12 to 16 inclusive, the feeding mechanism being mounted to swivel away from the wheels to avoid damage if a jam should occur. A hopper 210 with a flared bottom is secured to a flared hopper base 212 which is rigidly secured to the slotted upper end of a sleeve 214. The sleeve is supported on a shoulder at the upper end of a hollow post 216 which in turn is clamped at its lower end in the split end of a bracket 218. The bracket has a dovetailed slide 220 engaging a dovetailed tongue 222 at the upper surface of a swivel plate 224 having a trunnion 226 journalled in a boss on a supporting arm 228 which is secured to a stud 230 projecting upwardly from a boss 231 on a water guard 232. The swivel plate 224 and its trunnion 226 are journalled by ball thrust bearings 234 in the arm 228, the lower thrust bearing being retained by a headed screw 236.

A feed nut 238 is secured on the bracket 218 and engaged by an adjusting screw 240 which is journalled for rotation without endwise movement in a plate 242 attached to the swivel plate and its tongue 222. The screw adjusts the feed mechanism with respect to the work support. To further support the swivel plate, the arm 228 has a segmental extension or platform 244 providing a supporting track for a pair of rollers 246 journalled in recesses in the swivel plate, one of the recesses being in a projection 248 at one side c. the swivel plate 224.

An angular stop block 250 (Figs. 12 and 15) has its vertical leg attached to one side of the arm 228 and serves as a stop for a stop button 252 horizontally arranged in an angle bracket 254 fastened to the projection 248 on the swivel plate 224. The co-operating stop members locate the feed mechanism and limit swinging movement towards the work support. A horizontal leg 256 of the stop block 250 is provided with a threaded hole to receive the upper threaded end of a bushing 258 containing a coiled spring 260 operating to urge a plunger 262 with a rounded top into a position behind the horizontal leg of the bracket 254, thereby releasably holding the stop button 252 against the stop block 250. A different relation in the normal working position of the parts occurs only in the case of a jam in the rollers being fed to the machine, such jamming, as will appear, tending to swivel the whole feed mechanism around the axis of the trunnion 226 and thus moving the outlet away from the grinding wheel.

Figures 13, 14, 15, 16:
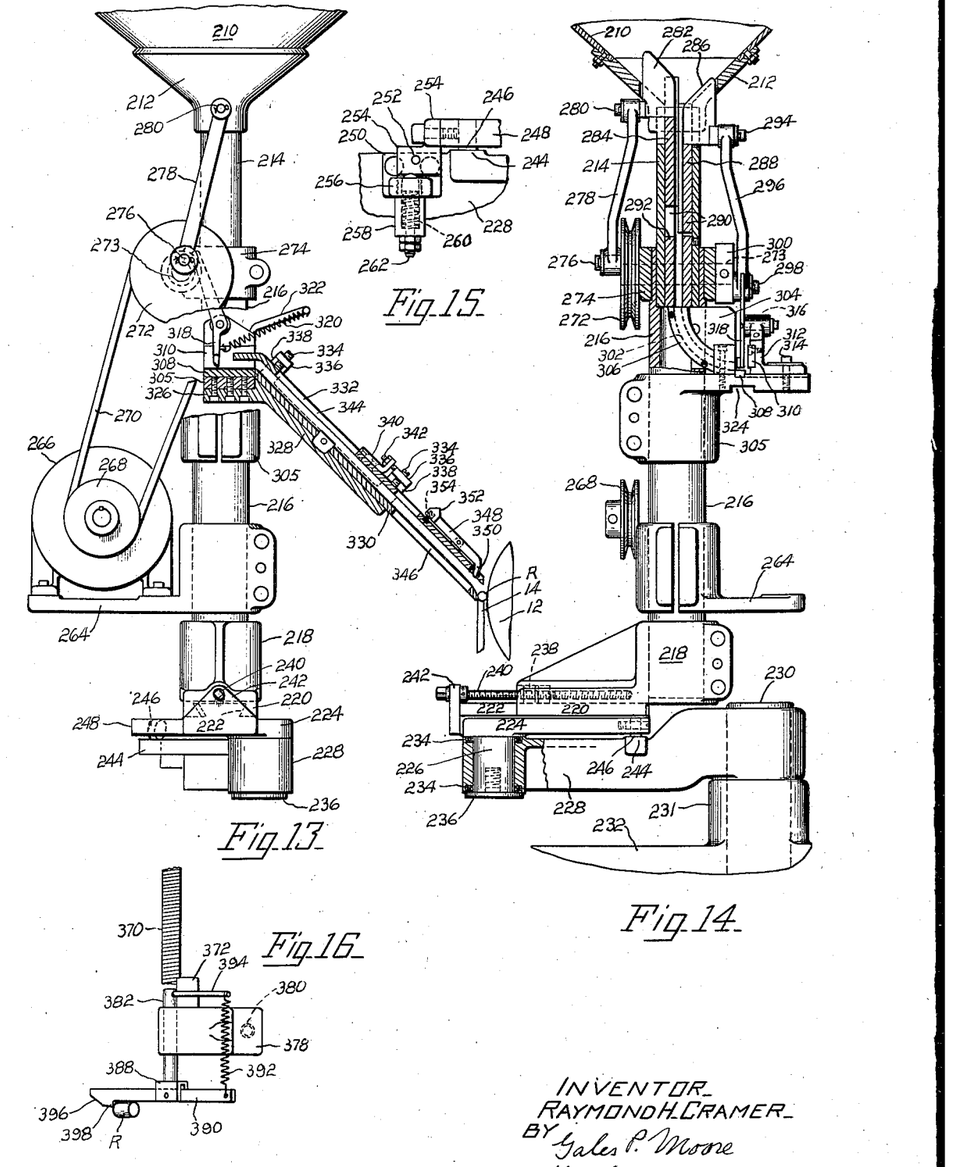
Fig. 13 is a front elevation of the feed mechanism with some parts broken away and some in section.
Fig. 14 is a side elevation of Fig. 13, with some parts omitted and some broken away and in section.
Fig. 15 is an enlarged side view of details associaed with the feed mechanism to locate the latter.
Fig. 16 is an enlarged view of portions of an ejector or work removing mechanism.

A motor supporting bracket 264 is clamped to the post 216 and supports a motor 266 having a driving pulley 268 engaging a belt 270 which runs around a pulley 272 secured to a shaft 273 which is journalled in a bracket 274 clamped around the upper end of the post 216. The pulley 272 has a crank pin 276 journalled in the lower end of a connecting rod 278 which is journalled on a pin 280 projecting laterally from an agitator blade 282 which in turn is secured in the slotted upper end of a sliding sleeve segment 284. Another agitator blade 286 is adapted to project through the bottom of the hopper and is secured to the slotted upper end of a second sleeve segment 288. The sleeve segments together form a central vertical passage for the rollers contained in the hopper and their lower ends are provided with fingers and slots 290 to interfit with slots and fingers at the upper end of a guide tube 292 which is fastened inside of the sleeve 214. The agitator blades have their upper surfaces substantially parallel to the flared sides of the hopper and they rise and fall alternately, the blades being flat and operating in slots in the hopper base 212. The blade 286 carries a pin 294 connected to a link 296 which is journalled on a crank pin 298 projecting from a crank disc 300 which is pinned on the shaft 273 driven by the pulley 272. The two crank pins 276 and 298 are at opposite sides of the pulley shaft so that the agitator blades alternate in their action.

As the rollers pass down out of the guide tube 292 in end to end relation, they are turned from a vertical position to a horizontal position by a curved guide 302 formed in a block 304 fastened to the top of a bracket 305 which is clamped on the post 216. The guide 302 has a curved cover 306 and delivers the rollers onto a supporting plate 308 on the top of the bracket 305. The end of each roller is adapted to be arrested by a wear plate 310 set into a recess of an angled bracket 312 which is adjustable on the bracket 305 and fastened in adjusted position by clamping screws 314. This adjustment depends upon the length of the roller and places the wear plate 310 at such a distance from the end of the curved guide 302 that a roller can be rolled laterally along the supporting plate 308. Thus the rollers are changed from an end to end relation to a side to side relation. The angled bracket 312 has a pivot stud 316 to which is secured a finger lever 318 which is actuated by the hub of the link 296, the finger lever thereby pushing the rollers intermittently along the supporting plate. The finger lever 318 is urged against the hub of the link by a coil spring 320 anchored to the bent end of a stud 322 which is secured in a hole of the bracket 312.

The bottom of the bracket 305 is provided with a notch 324 receiving a lug 326 on a chute bracket 328. The chute bracket supports a U-shaped chute 330 which is open upwardly and provided with a cover 332 which is clamped in place by screws 334 carried by overhanging lugs 336 on little standards 338 carried by the chute bracket. The chute cover has a short adjustment with reference to the work blade 14 by means of an angle piece 340 carrying an adjusting screw 342 which bears against one of the overhanging lugs 336. The cover overhangs the block 308 where the rollers enter and is slotted as indicated at 344 so that the rollers passing down the chute may be seen, the bottom of the chute 330 also having a slot at 346 of a width to let out rollers which might get turned lengthwise due to the fact that their length does not much exceed their diameter.

Pivoted to the top of the cover is a lever 348 having a detent finger 350 adapted to project into the chute to obstruct the rollers and prevent their escape, such action occurring whenever a jam occurs and the chute is thereby caused to swivel around the trunnion 226. The detent finger 350 is urged towards the operative position by a coil spring 354 housed in an end projection 352 which is normally held down by a plate 356 (Fig. 12) fastened by screws 358 at one side of an end guard 360 which covers the grinding wheel. It will be seen now that if the rollers jam between the chute and the adjacent oscillating parts, the pressure of the jam will be exerted against the end of the chute 330 and cause the entire chute mechanism to swing about the trunnion 226 thus carrying the mechanism away from the work blade and the grinding wheel. As soon as the detent projection 352 rides out from under the plate 356, the spring 354 will force the detent finger 350 into the chute and prevent the loss of the rollers.

The chute is normally arranged radially with respect to the axis of oscillation but inclines in the same direction as the top of the work blade, the outlet of the chute terminating close to the level of the roller locating plate 182. Normally the endmost roller is held back in the chute by resting against the bevelled surfaces 186 and 198 of the roller locating plate 182 and its clamp 190 but, as the regulating wheel unit and work support swing counterclockwise so that the locating face 184 passes the chute outlet, the roller will roll onto the blade surface 158 in front of the face 184 and, as the unit swings clockwise, the roller will then be pushed along the grinding wheel, its rotation being controlled by the regulating wheel as it passes through the machine. The inclination of the regulating wheel axis causes the roller to be urged backwardly against the locating face 184 for stabilized rotation on its axis not only while the roller is traversed across the grinding wheel but also while it is being pushed up to the grinding wheel. The oscillating unit carries the roller to a position (see Fig. 12) beyond the opposite edge of the grinding wheel where it is ejected by the following mechanism.

Adjustably fastened to a wheel guard 370 (see Figs. 12 and 16) is an angle bracket 372 secured by screws 374. The bracket has a guide lug 376 on which an angle bracket 378 is adjustably secured by a screw 380. The adjustment of the bracket 372 is approximately radially of the wheel to compensate for wheel wear, whereas the bracket 378 is adjustable laterally of the wheel to position the ejector mechanism with respect to a ground roller as such roller swings free of the wheel. A stud 382 is fixed in the end of the bracket 378 by a clamping pin 384 backed up by a set screw 386. The stud has its lower end provided with a fork 388 in which is pivoted an ejector lever 390 having the bent form indicated in Figure 12. A coil spring 392 is fastened to the finger and to a pin 394, the movement which the spring imparts being limited by contact of the lever 390 with the fork 388. In ejecting position, the end of the lever projects over the work blade and the locating plate 182 and between the two rotating wheels where it is provided with a cam surface 396 and with a hook 398. As a roller R is carried beyond the edge of the grinding wheel it engages the cam surface 396 and rides behind the hook 398. Hence when the oscillating unit returns, the roller is arrested, and, as the cam surface 174 on the cam plate 168 passes out from under the roller, the roller is cammed off laterally into a suitable exit chute.

The grinding wheel (see Figs. 17 to 22) is secured by a clamping plate 408 to a hub member 410 which is secured by a nut 412 to the end of a spindle 414 which is journalled in half bearings 416 and 418 of a head 420. The previously mentioned end cover 360 is detachable from the wheel guard 370 and, for this purpose, the cover is provided with radially open slots 422 for eye bolts 424 the eyes of which surround pivot pins 426 carried by the wheel guard 370. The cover is clamped by thumb nuts 428 threaded on the ends of the eye bolts outside of the cover. Upon loosening the clamping nuts 428 the eye bolts can be swung around their pivots and out of the slots 422 to permit removal of the cover.

Figure 17:
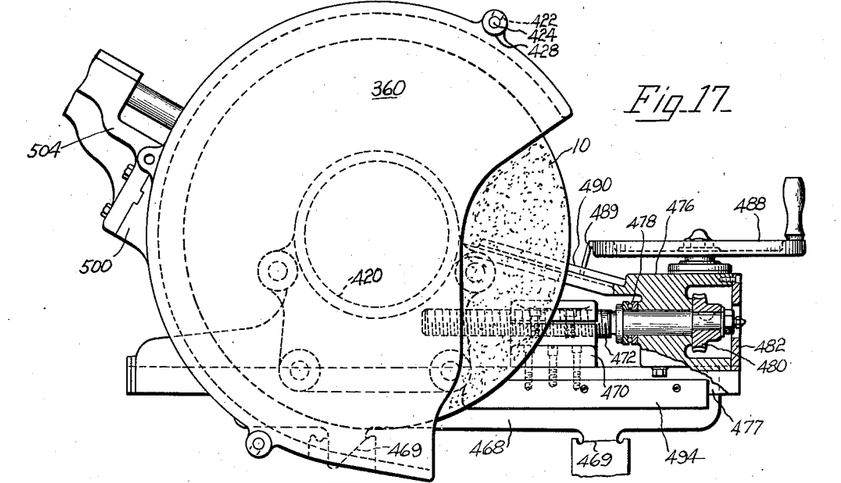
Fig. 17 is a side elevation of the grinding wheel head with some parts in section.

Suitable sealing means is provided between the inner side of the grinding wheel and the head to keep out grit and retain lubricant. This comprises sealing plates 430 and 432, each having circular ribs 431 projecting laterally into circular recesses at the side of the hub member 410. In the sealing plate 430 are contained suitable sealing members (not shown) to form a labyrinth seal.

Figure 18:
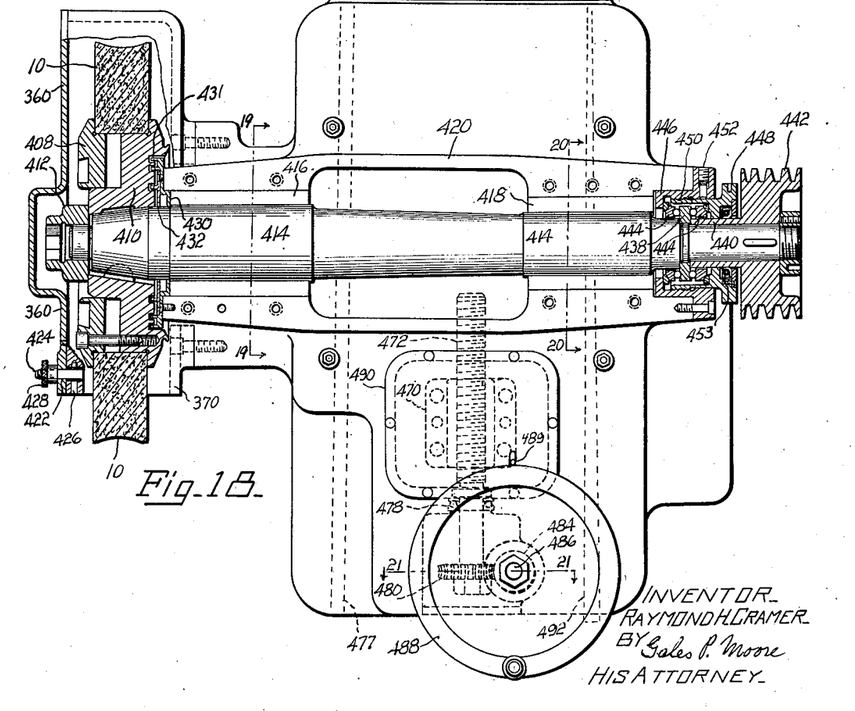
Fig. 18 is a plan view of the grinding wheel head with its cover removed and some parts in section.
Figures 19, 20:
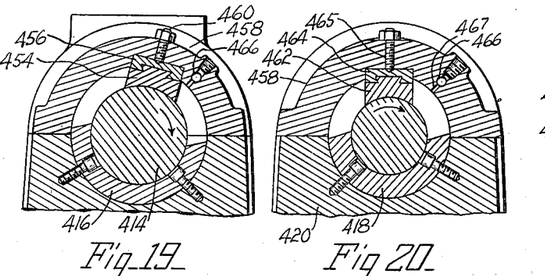
Fig. 19 is a sectional view taken on line 19—19 of Fig. 18.
Fig. 20 is a sectional view taken on line 20—20 of Fig. 18.
Figure 21:
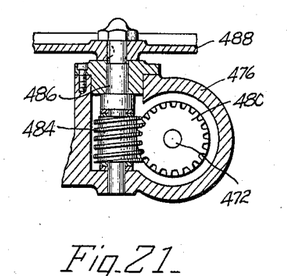
Fig. 21 is a sectional view taken on line 21—21 of Fig. 18.
Figure 22:
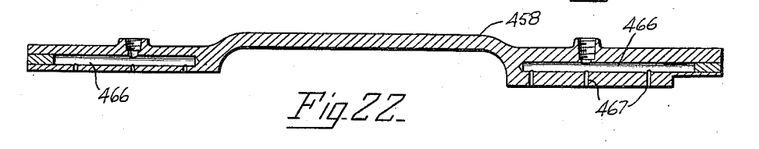
Fig. 22 is a longitudinal sectional view of the wheel head cover.

Near the opposite end of the spindle a thrust bearing collar 438 is secured against a shoulder of the spindle by an extension sleeve 440 formed on a driven belt pulley 442. The thrust collar 438 engages two rows of rolling elements which co-operate with thrust rings 444 which engage abutment rings one of which bears against a flanged bearing housing 446 and the other bearing against a flanged collar 448 having a sleeve extension 450 which is externally threaded in an internally threaded portion of the bearing housing 446. The extension is locked in position by a shoe backed up by a set screw 452. There is also a suitable seal 453 between the collar 448 and the extension 440.

Opposed to the half bearing 416 (Fig. 19) is a pressure pad 454 dovetailed into a plate 456 occupying a recess in a cover 458 for the head 420. Adjusting screws 460 in the cover are adapted to engage the plate 456 and urge the pressure pad 454 towards the spindle. It will be noted that the half bearing 416 and the pressure pad 454 are arranged at an angle to the vertical to compensate for the non-horizontal thrust exerted by the roller against the grinding wheel. In the case of the bearing nearest to the pulley, there is provided a pressure pad 462 (Fig. 20) dovetailed into a plate 464 adjusted by screws 465, this bearing being symmetrical with respect to the vertical axis because the belt pull is downwardly. The cover 458 is provided with longitudinal oil ports 466 communicating by radial openings 467 with the bearings.

The wheel head 420 is supported by a plate 468 adjustably secured on faces 469 carried by the frame, and the wheel head has cross sliding movement on the plate 468 to feed the grinding wheel towards the work. To effect this, a nut 470 is fastened to the lower plate 468 and receives a feed screw 472 which is journalled in an extension housing 476 of the head 420, the head and the extension having a slideway 477. The feed screw is held from endwise movement in the housing by a thrust bearing 478 engaging a shoulder on the feed screw and by a worm gear 480 fastened to the outer end of the feed screw in a recess closed by a cover plate 482. A worm 484 (Fig. 21) is keyed to a vertical shaft 486 between thrust washers and is journalled for rotation in the extension housing 476 when turned by a hand wheel 488. The hand wheel desirably has index lines in the periphery to co-operate with a pointer 489 on the work head. The slideway 477 is provided at one side with a take-up gib 492, the other side of the slideway being closed by a dust plate 494.

Accuracy of the contour of the wide grinding wheel is very important and accordingly special means are provided for generating this contour. There is a rough dressing device and a more refined dressing device, the former being described first. Referring to Figures 23, 24, 25 and 26, the wheel guard 370 has a pad 500 with a guiding and locating groove to receive a locating tongue 502 on a bracket 504 having a U-shaped recess or guideway 506 closed by a cap 508 and arranged substantially radially with respect to the grinding wheel. A brake shoe 510 backed up by a set screw projects through the cover to engage an arm or bar 512 which is square in cross section and slidable for adjustment in the recess 506.

The bar 512 has a fork 514 at one end, the arms of the fork being provided with caps 516 to form bearings for an oscillating shaft 518 having an enlargement or block 520 between the arms of the fork. The shaft is arranged in the plane of the grinding wheel and parallel to a tangent thereto. The fork 514 projects through a slot in the wheel guard 370, and the enlargement 520 carries the diamonding mechanism as will appear. The enlargement is internally threaded at 522 to receive a screw 524 which is locked in adjusted position by a flanged locking shoe 526 preferably of brass and held against the screw 524 by a set screw 528 threaded in the enlargement 520. The screw 524 (Fig. 26) is hollow, having a reamed hole 530 opening into a counterbore 532. The outer end of the screw 524 is flattened at the sides as at 534 to provide a wrench hold. The screw is radially tapped at 536 to receive a set screw 538 which engages and locks the shank of a stud 540 which fits in the counterbore. The tip of the stud 540 carries a diamond 542 for dressing the grinding wheel.

Figures 23, 24, 25, 26:
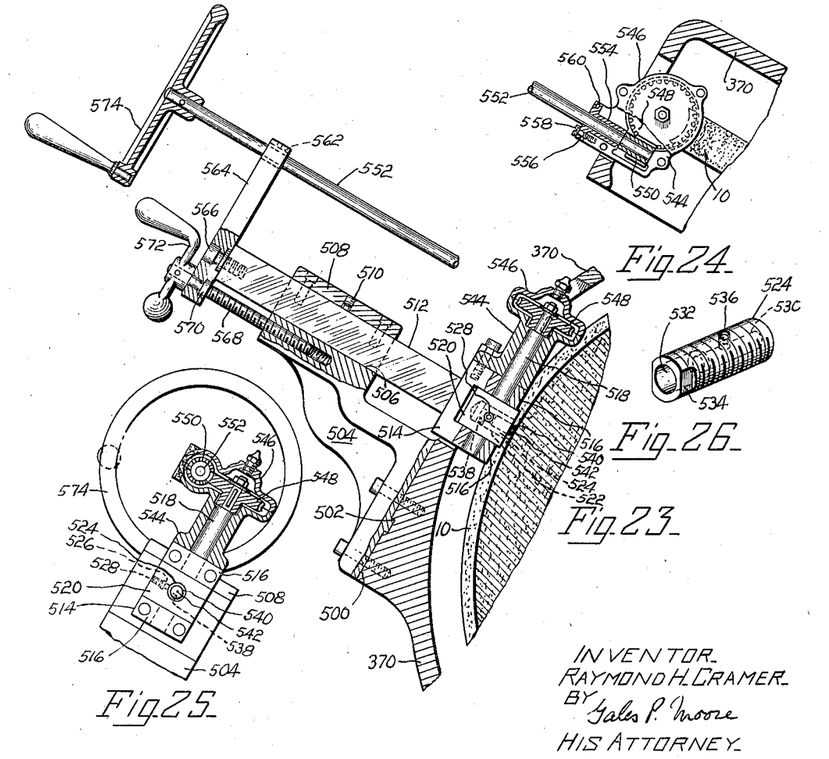
Fig. 23 is a side view, with parts in section, of the rough dressing mechanism for the grinding wheel.
Fig. 24 is a sectional view of a portion of Fig. 23.
Fig. 25 is a rear view, partly in section, of portions of Fig. 23.
Fig. 26 is an enlarged perspective view of a detail of the dressing mechanism.

A housing 544 is secured to the top of the fork 514 by cap screws and is closed by a housing cap 546 covering a worm gear 548 which is keyed on a reduced extension of the oscillating shaft 518. The worm gear is driven by a worm 550 pinned to one end of a shaft 552 which is adapted to be manually oscillated. The shaft is journalled at the worm end in an eccentric sleeve 554 which has a flange provided with an arcuate slot 556 for a screw 558 by which the eccentric sleeve is held in adjusted position. The flange of the eccentric sleeve has radial holes 560 to receive a suitable tool by which it is turned to adjust it. Near the other end the shaft 552 is journalled in a bushing 562 at the upper end of a plate 564 fastened by screws 566 to the outer end of the bar 512. A screw 568 is threaded in the bracket 504 and is held for rotation without endwise movement in the plate 564 by a collar 570 and by the hub of an operating handle 572. A hand wheel 574 is secured to the outer end of the shaft 552 to provide for oscillation of the latter The adjusting screw 568 and its handle 572 move the bar 512 to provide for adjusting the axis of oscillation of the shaft 518 with respect to the grinding wheel and to compensate for wear of the latter. The radius of oscillation of the diamond depends on the distance of the diamond from the axis of the shaft 518 and this radius is adjusted by adjusting the screw 524 in its opening of the enlargement 520. In operation, the hand wheel 574 is oscillated thereby oscillating the shaft 518 and the diamond. This oscillation is slow in order that the diamond may pass slowly across the concave surface of the grinding wheel. This is the rough dressing operation. For small differences in the radius to be generated, the screw 524 is adjusted in its recess. For substantial differences in the radii, the screw 524 is replaced by another one which may be longer as is illustrated in the dressing device hereinafter described for the regulating wheel.

The foregoing dressing mechanism can be set opposite to the central plane of the grinding wheel by means of the bracket 504 to produce a symmetrical contoured surface. However, it is sometimes desirable to give that side of the wheel where the work enters a slight lead of approximately the amount to be removed from the work in grinding. This is done by shifting the bracket 504 a little off center towards the entrance side and then dressing that half of the wheel to give a lead or fade out which will permit the work to fully enter between the wheels before any appreciable grinding occurs. The wheels will then take hold of the work less abruptly and produce a lighter initial cut than otherwise. This lead may also be allowed to wear itself in since the greater part of the grinding will occur at the work entrance side where the unground work is larger. The other side of the wheel has the contour desired for the work and this is made very accurate by a fine dressing device next described.

Figures 27, 28:
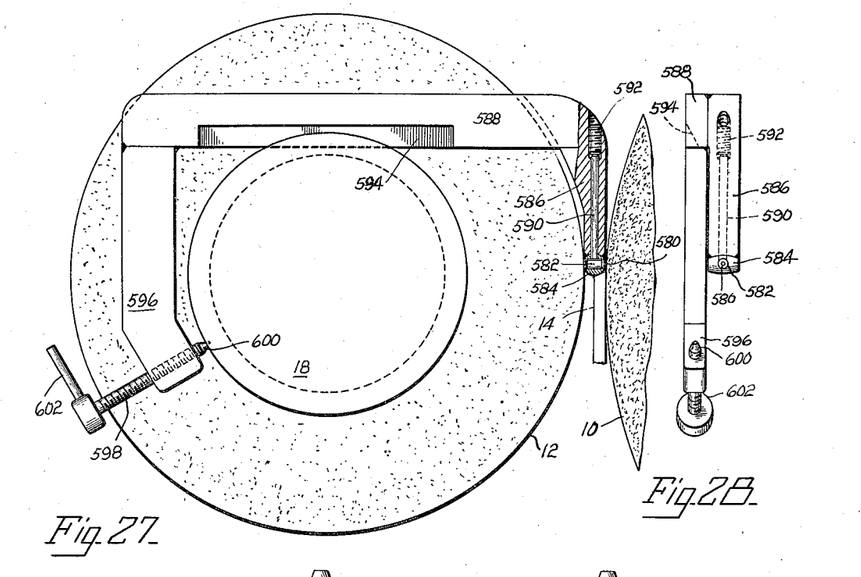
Fig. 27 is a side elevation partly in section of the fine dressing mechanism for the grinding wheel.
Fig. 28 is a front view of the dressing attachment of Fig. 27.

The fine dressing device is set up so that the motion of the diamond will faithfully reproduce the movement of the surface of the product roller along the grinding wheel and this is accomplished by using the same elements which support the work when grinding to support the dresser when dressing. Referring to Figures 27 and 28, a diamond 580 is carried by a stud 582 inserted in a recess in a soft roller 584 welded to the concave lower end of an arm 586 which depends from a bracket 588. The roller may be regarded as a dummy or master roller of the size desired for the finished product and the tip of the diamond lies in its surface at the transverse center thereof. The arm 586 is offset from the bracket 588 so that the diamond will lie in the central plane of the grinding wheel and regulating wheel. The stud 582 is secured in its recess by a clamping rod or shoe 590 backed up by a set screw 592, the hole for the rod 590 and the recess for the stud 582 being bored after the roller is secured to the arm. The bracket 588 has one side bevelled off as indicated at 594 to exactly fit the undercut bevel surface on the clamping plate 18 for the regulating wheel. The opposite side of the bracket 588 fits against the side of the regulating wheel which is stationary when the dressing operation on the grinding wheel is performed. Projecting downwardly from the further end of the bracket 588 is an arm 596 having a threaded opening for a clamping screw 598 having a cone point 600 to fit against the bevel on the clamp plate 18. The screw is provided with a handle 602 for turning it.

In this dressing operation, the roller 584 is supported on the work blade 14 in exactly the position the product roller will occupy when grinding occurs. The roller also rests against the periphery of the stationary regulating wheel and is pulled against these two members by the cone pointed screw 598. Lateral location of the diamond is provided by the side of the regulating wheel which is in firm contact with the bracket. Having set up the dressing mechanism so that the diamond reproduces the location of the periphery of the roller, the regulating wheel unit and blade, the regulating wheel being stationary, are oscillated manually slowly to traverse the diamond across the grinding wheel. A very accurate contour of the wheel is thus obtained. For other roller sizes, a correspondingly designed fixture is used.

The regulating wheel dressing mechanism (Figs. 29 and 30) is carried by the cover 45 for the head 24. The cover 45 has a tongue 610 to enter a recess in and locate a bracket 612 which is fastened to the cover by screws 614. The bracket has a dovetail guideway 616 for a slide 618 having a tapped hole for a feed screw 620 which is journalled for rotation in a plate 622 and held from endwise movement by a collar 624 and the hub of a handle 626 pinned to the upper end of the feed screw. Projecting from the slide 618 are bearing lugs 628 and 630 each having a cap 632 to provide bearings for a shaft comprising spaced trunnions 636 projecting from an enlargement or connecting block 634. One of the trunnions has a reduced extension on which is pinned a worm wheel 638 driven by a worm 640 on a shaft 642 which has an operating hand wheel 644. The shaft 642 is journalled in lugs 646 projecting laterally from the upper part of the slide. The block 634 is provided with a threaded recess 648 to receive a screw 650 clamped in the recess by a flanged shoe 652 backed up by a set screw 654 threaded in the block. The screw 650 is provided with a counterbored recess 656 to receive a stud 658 carrying a diamond 660. The shank of the stud 658 is secured to the screw 650 by a set screw 662.

Figure 29:
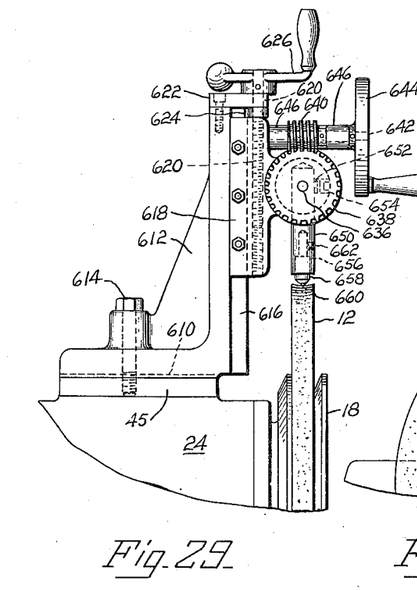
Fig. 29 is a front elevation of the dressing mechanism for the regulating wheel.
Figure 30:
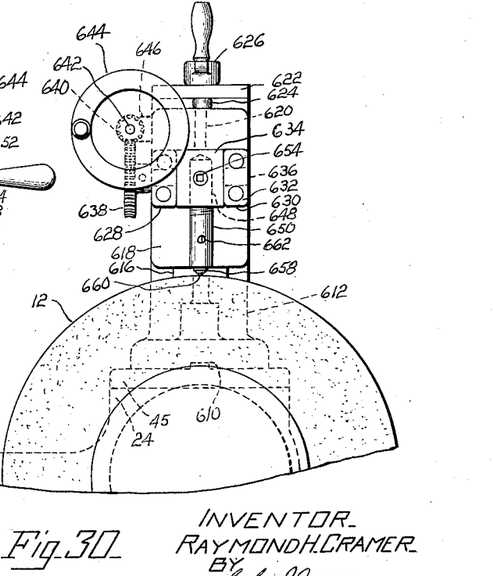
Fig. 30 is a side elevation of the dressing mechanism of Fig. 29.

The operation is similar to that of the dressing mechanism for the grinding wheel. The screw 620 and its operating handle 626 provide for locating the axis of oscillation of the trunnions 636 with reference to the regulating wheel and to provide for wear of the latter. The distance of the diamond 660 from the axis of oscillation determines the contour of the wheel and is adjusted by moving the screw 650 in the block 634. When this adjustment has been made, the diamond and its carrying block are oscillated slowly by oscillating the hand wheel 644. The setup here shown will generate a larger radius than that indicated in the dressing mechanism for the grinding wheel and illustrates how a longer sleeve 650 may be substituted for the comparatively short sleeve 524 of the grinding wheel dressing mechanism. In each case the minor differences in radii are taken care of by adjusting the screw in its recess, and the major differences are provided for by substituting screws of different lengths.

When the wheels are thus properly dressed and the machine set up for grinding a roller of given form and dimensions, a supply of rollers is placed in the hopper. The feed mechanism, the oscillating mechanism and the wheel driving mechanism are all set in motion. The rollers feed vertically down from the hopper and are turned to a horizontal position by the curved guide 302. The lever arm 318 pushes the rollers laterally into the inclined chute 330. The rollers slide down the chute in a side to side relation, the lowermost roller resting against the bevelled face 198 until the oscillating unit swings counterclockwise (in Fig. 12) to carry the roller locating face 184 past the chute outlet. A roller then drops onto the work support and, when the oscillating unit swings clockwise, the face 184 pushes the roller along the grinding wheel and past the latter. As the roller approaches this discharge position, it engages the cam 396 on the ejector lever and rides behind the hook 398. As the oscillating unit again reverses its motion, the roller is arrested by the hook, and the work support and the cam plate 170 ride out from under the arrested roller. The cam surface 174 then cams the roller laterally into a suitable chute as the oscillating unit returns to receive an unground roller.

I claim:

1. In a machine of the character described, a grinding wheel, a regulating wheel, a work support between the wheels, all of said parts being contoured to fit the contoured surface of a work-piece, means for causing a relative angular oscillation between the grinding wheel on the one hand and the regulating wheel and work support on the other, a work locating member near one end of the work supporting surface for locating a work-piece endwise, the other end of the work supporting surface being open, and means for causing a ground work-piece to be removed endwise through said open end of the work supporting surface; substantially as described.

2. In a machine of the character described, a grinding wheel, a regulating wheel, a work support between the wheels, all of said parts being contoured to fit the contoured surface of a work-piece, means for causing a relative angular oscillation between the grinding wheel on the one hand and the regulating wheel and work support on the other, a work locating member near one end of the work supporting surface for locating a work-piece endwise, the other end of the work supporting surface being open, and means comprising a lever having a hook to engage behind one end of the work-piece to remove the work-piece endwise through said open end of the work supporting surface; substantially as described.

3. In a machine of the character described, a grinding wheel, a regulating wheel, a work support between the wheels, all of said parts being contoured to fit the contoured surface of a work-piece, means for causing a relative angular oscillation between the grinding wheel on the one hand and the regulating wheel and work support on the other, a work locating member near one end of the work supporting surface for locating a work-piece endwise, and the other end of the work supporting surface being open, a lever having a cam to engage and ride over the work-piece, and a hook adapted to engage behind the end of the work-piece to remove the latter through said open end of the work supporting surface; substantially as described.

4. In a machine of the character described, a grinding wheel, a regulating wheel, a work support between the wheels, all of said parts being contoured to fit the contoured surface of a work-piece, means for causing a relative angular oscillation between the grinding wheel on the one hand and the regulating wheel and work support on the other, a work locating member near one end of the work supporting surface for locating a work-piece endwise, and the other end of the work supporting surface being open, means for causing a ground work-piece to be removed endwise through said open end of the work supporting surface, and a cam for causing the work-piece to discharge laterally; substantially as described.

5. In a machine of the character described, a grinding wheel, a regulating wheel, a work support between the wheels, all of said parts being contoured to fit the contoured surface of a work-piece, means for causing a relative angular oscillation between the grinding wheel on the one hand and the regulating wheel and work support on the other, a work locating member near one end of the work supporting surface for locating a work-piece endwise, the other end of the work supporting surface being open and unobstructed, means for feeding work-pieces onto the work supporting surface in front of the locating member, and means for discharging the work-pieces endwise through the open end of the work supporting surface; substantially as described.

6. In a machine of the character described, a grinding wheel, a regulating wheel, a work support in the throat between the wheels, a work locating member having a work locating and pushing surface at one end of the work supporting surface, the other end of the work supporting surface being open and unobstructed, means for causing a relative oscillating movement between the grinding wheel on the one hand and the regulating wheel, locating member and work support on the other to cause the locating surface to push a work-piece beyond the grinding wheel, and means at said unobstructed end of the work supporting surface for arresting the work-piece to enable the work support to ride out from under the piece and release it on the return stroke; substantially as described.

7. In a machine of the character described, a grinding wheel, a regulating wheel, a work support in the throat between the wheels, means for causing a relative angular oscillation between the grinding wheel on the one hand and the regulating wheel and work support on the other, work feed mechanism having an outlet member adjacent to the work support to supply work thereto at one limit of oscillation, and means for mounting the outlet member to shift away from the grinding throat in case of a jam; substantially as described.

8. In a machine of the character described, a grinding wheel, a regulating wheel, a work support in the throat between the wheels, means for causing a relative angular oscillation between the grinding wheel on the one hand and the regulating wheel and work support on the other, work feed mechanism having an outlet member adjacent to the work support to supply work thereto, means for mounting the outlet member to shift away from the grinding throat, and means for preventing loss of the work-pieces from the outlet member when the latter so shifts; substantially as described.

9. In a machine of the character described, a grinding wheel, a regulating wheel, a work support in the throat between the wheels, means for causing a relative angular oscillation between the grinding wheel on the one hand and the regulating wheel and work support on the other, work feed mechanism having an outlet adjacent to the work support to supply work thereto, a pivotal mounting for said feed mechanism to provide for its swinging away from the work support, and means for releasably holding said feed mechanism with its outlet adjacent to the work support and ready to so swing away; substantially as described.

10. In a machine of the character described, a grinding wheel, a regulating wheel, a work support in the throat between the wheels, means for causing a relative angular oscillation between the grinding wheel on the one hand and the regulating wheel and work support on the other, work feed mechanism having an outlet adjacent to the work support to supply work thereto, a pivotal mounting for the feed mechanism, co-operating stop members to limit pivoting of the feed mechanism towards the work support, and a lyieldable member to releasably hold said stop members in engagement; substantially as described.

11. In a machine of the character described, a grinding wheel, a regulating wheel, a work support in the throat between the wheels, means for causing a relative angular oscillation between the grinding wheel on the one hand and the regulating wheel and work support on the other, work feed mechanism having an outlet adjacent to the work support to supply work thereto, a pivotal mounting for said feed mechanism, a detent at said outlet, and means for making said detent operative to retain the work when the feed mechanism pivots; substantially as described.

12. In a machine of the character described, a grinding wheel, a regulating wheel, a standard, a work blade, a clamp for securing the blade to the standard, a work locating member near one end of the work supporting surface, a clamp for securing the work locating member on the standard, and a cam plate near the other end of the work supporting surface and terminating below the later, and a clamp for securing the cam plate on the standard; substantially as described.

13. In a machine of the character described, a grinding wheel, a regulating wheel, a standard, a work blade secured to the standard, a work locating member near one end of the work supporting surface, and a cam plate near the other end of the work supporting surface and terminating below the latter; substantially as described.

14. In a machine of the character described, a grinding wheel, a regulating wheel having a transversely curved periphery, a standard projecting upwardly between the wheels, a work blade secured to the standard, a work locating plate mounted on the top of the standard and terminating in a face extending crosswise with respect to the work supporting surface of the blade, and parallel to the central plane of the regulating wheel to locate a curved work-piece with respect to the curve of the regulating wheel and a clamp fastened to the top of the standard at one side of the regulating wheel for securing the plate to the standard; substantially as described.

15. In a machine of the character described, a grinding wheel, a regulating wheel, a standard having an upper surface of substantial area at one side of the regulating wheel, a work blade, a blade clamp for securing the blade to the standard, a work locating plate terminating near one end of the work supporting surface, and a clamp fastened to said upper surface of the standard for securing the plate to the standard; substantially as described.

16. In a machine of the character described, a grinding wheel, a regulating wheel, a standard having a substantially vertical recess open towards the grinding wheel and having a shoulder, a work blade in said recess and having a work supporting surface, and a blade clamp for securing the blade in the recess and against the shoulder; substantially as described.

17. In a machine of the character described, a grinding wheel, a regulating wheel, a standard, a work blade secured to the standard, the standard having an upper arcuate surface, an arcuate plate on said arcuate surface and having a work locating face near one end of the work supporting surface of the blade, and a clamp on the top of the standard for securing the plate in adjusted position on said arcuate face; substantially as described.

18. In a machine of the character described, a grinding wheel, a regulating wheel, a standard having a recess with a shoulder, a work blade engaging the shoulder and having its opposite edge serrated, a blade clamp having a serrated edge to engage the serrated edge of the blade, and means for securing the clamp to the standard; substantially as described.

19. In a machine of the character described, a grinding wheel, a regulating wheel, a standard having an internal recess to receive a portion of the regulating wheel, the standard having an external recess facing the grinding wheel, and a work blade secured in said external recess; substantially as described.

20. In a machine of the character described, a grinding wheel, a regulating wheel, a standard having a work support between the wheels, a support for oscillating the standard and the regulating wheel as a unit about an axis, and means for turning the standard around said axis to adjust it angularly with respect to the oscillating support; substantially as described.

21. In a machine of the character described, a grinding wheel, a regulating wheel, a standard having a work support between the wheels, a support for oscillating the standard and the regulating wheel as a unit about an axis, and means for turning the standard with respect to said support, said means comprising a stud carried by one of said last named parts, and a pair of opposed adjusting screws engaging the stud and carried by the other part; substantially as described.

22. In a machine of the character described, a grinding wheel, a regulating wheel, a standard having a work support between the wheels, a support mounted for angular oscillation around an axis, and an adaptor between the support and the standard and having means to locate the standard with respect to said axis of oscillation; substantially as described.

23. In a machine of the character described, a grinding wheel and a regulating wheel each having a transversely curved operative surface, a work blade between the wheels, a support for oscillating one of said wheels and the blade as a unit about an axis, and means for rotating said one wheel and having a drive shaft concentric with the axis of oscillation; substantially as described.

24. In a machine of the character described, a grinding wheel, a regulating wheel, a work blade between the wheels, a support for oscillating one of said wheels and the blade as a unit about an axis, the support having a hollow column journalled for turning movement, a drive shaft passing through said hollow column and having means to rotate said one wheel; substantially as described.

25. In a machine of the character described, a grinding wheel, a regulating wheel, a work blade between the wheels, a support for oscillating one of said wheels and the blade as a unit around an axis, a countershaft journalled in the oscillating support and having means to rotate said one wheel, and a drive shaft concentric with the axis of oscillation and geared to said countershaft; substantially as described.

26. In a machine of the character described, a grinding wheel, a regulating wheel, a work blade between the wheels, a support for oscillating one of said wheels and the blade as a unit around an axis, a countershaft journalled in the oscillating support, a drive shaft concentric with the axis of oscillation and geared to said countershaft, a head shiftable on the oscillating support and having a spindle connected to said one wheel, and means for driving the spindle from the countershaft, said driving means having a take-up to provide for shifting of the head; substantially as described.

27. In a machine of the character described, a grinding wheel and a regulating wheel each having a transversely contoured surface for operation on a contoured work-piece, means for causing a relative angular oscillation between the grinding wheel and the regulating wheel, a dresser for truing one of said wheels, and means for utilizing the other wheel for locating and holding the dresser; substantially as described.

28. In a machine of the character described, a grinding wheel and a regulating wheel each having a transversely contoured surface for operation on a contoured work-piece, a work support between the wheels, means for causing a relative angular oscillation between the grinding wheel on the one hand and the regulating wheel on the other, a dresser for truing the grinding wheel, and means for utilizing the regulating wheel and the work support for locating and holding the dresser; substantially as described.

29. In a machine of the character described, a grinding wheel and a regulating wheel each having a transversely contoured surface for operation on a contoured work-piece, means for causing a relative angular oscillation between the grinding wheel and the regulating wheel, a dresser for truing one of said wheels, and means for supporting the dresser in the same position as a point in the surface of an accurately sized work-piece in its grinding position; substantially as described.

30. In a machine of the character described, a grinding wheel and a regulating wheel each having a transversely contoured surface for operation on a contoured work-piece, means for causing a relative angular oscillation between the grinding wheel and the regulating wheel, a dummy work-piece mounted in the same location between the wheels as a product piece, and a dresser mounted in the contoured surface of the dummy work-piece; substantially as described.

31. In a machine of the character described, a grinding wheel and a regulating wheel each having a transversely contoured surface for operation on a contoured work-piece, a work support between the wheels, means for causing a relative angular oscillation between the grinding wheel and the regulating wheel, a dresser for truing one of said wheels, and a dresser carrying member clamped against the work support and the other wheel; substantially as described.

32. In a machine of the character described, a grinding wheel and a regulating wheel each having a transversely contoured surface for operation on a contoured work-piece, a work support between the wheels, means for causing a relative angular oscillation between the grinding wheel and the regulating wheel, a dresser for truing one of said wheels, a dummy work-piece carrying said dresser, and clamping means for securing said dummy work-piece against the work support and the other wheel in the same position as a finished product piece; substantially as described.

33. In a machine of the character described, a grinding wheel and a regulating wheel each having a transversely contoured surface for operation on a contoured work-piece, a work support between the wheels, means for causing a relative angular oscillation between the grinding wheel and the regulating wheel, a dresser for truing one of said wheels, a dresser carrying member, clamping means for securing the carrying member against the work support and the other wheel, and said clamping means comprising a bracket engaging one side of said other wheel; substantially as described.

34. In a machine of the character described, a grinding wheel, a regulating wheel, a work support between the wheels, a dresser for truing one of said wheels, a dummy work-piece carrying said dresser, means for clamping the dummy work-piece against the work support and the other wheel, and means for causing a relative traversing movement between the wheel to be dressed and the dummy work-piece; substantially as described.

35. In a machine of the character described, a grinding wheel, a regulating wheel, a work support between the wheels, a dresser for truing one of said wheels, and a bracket clamped to the side of the other wheel and having an arm projecting between the wheels and carrying the dresser; substantially as described.

36. In a machine of the character described, a grinding wheel, a regulating wheel, a work support between the wheels, a dresser for truing one of said wheels, a bracket engaging the side of the other wheel and having an arm projecting between the wheels to support the dresser, a plate at one side of said other wheel, and means for securing the bracket between said plate and said other wheel; substantially as described.

37. In a machine of the character described, a grinding wheel, a regulating wheel, a work support between the wheels, a dresser for truing one of said wheels, a bevelled plate at one side of the other wheel, a bracket engaging said other wheel and having a bevelled surface engaging the bevelled plate, means for clamping the bracket between said other wheel and the plate, and the bracket having means for holding the dresser between the wheels; substantially as described.

38. In a machine of the character described, a grinding wheel, a regulating wheel, a work support in the throat between the wheels, means for causing the regulating wheel and the work support to shift as a unit across the operative face of the grinding wheel, a work locating and pushing member having a locating face near the trailing end of the work support and at a predetermined distance from the central plane of the regulating wheel, and means for supporting the regulating wheel with its axis slightly inclined out of a common plane containing the axis of the work-piece and the axis of the grinding wheel, the inclination being in such a direction as to cause the work engaging portion of the regulating wheel to have a backward feeding action lengthwise of the piece to effect a stabilizing pressure of the work piece against said face as the piece is pushed endwise up to and across the grinding wheel; substantially as described.

39. In a machine of the character described, a grinding wheel, a regulating wheel, a work support adapted to support a work-piece in the throat between the wheels, means for shifting the work support through the throat to traverse the work-piece across the operative face of the grinding wheel, a work engaging member secured near one end of the work support and having a locating and pushing face engaging the trailing end of the work-piece, and means for supporting one of the wheels with its axis slightly inclined to a common plane containing the axis of the other wheel and the axis of the work-piece, and the inclination being in a direction to effect a backward stabilizing pressure of the work-piece against said locating face as the piece is pushed endwise thereby; substantially as described.

40. In a machine of the character described, a grinding wheel, a regulating wheel, a work support adapted to support a work-piece in the throat between the wheels, means for shifting the work support through the throat to traverse the work-piece across the operative surface of the grinding wheel, a work engaging member having a pushing face to present a substantial area of contact to the trailing end of the piece, and means for supporting the regulating wheel with its axis inclined in such a direction as to effect a backward pressure of the piece against said face as the piece is pushed endwise thereby; substantially as described.

41. In a machine for precision grinding of contoured work, a grinding wheel and a regulating wheel each having its periphery transversely curved to correspond to the curvature of an interposed work piece, a work support in the throat between the wheels, means for causing angular oscillation of the regulating wheel and the work support as a unit around an axis, a work locating member secured near the trailing end of the work support and having a locating and pushing face arranged at a predetermined distance from the central plane of the regulating wheel to engage and locate the piece endwise in accordance with the character of the piece, and means for supporting one of the wheels with its axis inclined in such a direction as to effect a backward pressure of the piece against the locating face as the piece is pushed endwise across the periphery of the grinding wheel; substantially as described.

42. In a machine for precision grinding of contoured work, a grinding wheel, a regulating wheel, a work rest in the throat between the wheels, means for oscillating the regulating wheel and the work rest as a unit about an axis, a work engaging member having a locating and pushing face near one end of the work rest to locate a work-piece endwise, and a clamp for fixing said member with its locating face at a selected distance from the central plane of the regulating wheel equal to the length of that portion of the piece included between its located face and that cross section where its diameter reaches a limit of size; substantially as described.

43. In a machine for precision grinding of contoured work, a grinding wheel, a regulating wheel, a work rest in the throat between the wheels, a support for oscillating the regulating wheel and the work rest as a unit about an axis, and means for further effecting relative angular movement around the same axis between the work rest and the regulating wheel; substantially as described.

44. In a machine for precision grinding of contoured work, a grinding wheel and a regulating wheel each having its periphery transversely curved to correspond to the curvature of an interposed work-piece, a work support in the throat between the wheels, the support being curved lengthwise of the throat to substantially conform to the piece and having a recess extending entirely across the work supporting surface to clear a high spot on the piece and provide two separated areas of support; substantially as described.

RAYMOND H. CRAMER.